W. P. STROTHER.
HEATING MEANS FOR MINERAL OILS.
APPLICATION FILED FEB. 12, 1919.
1,326,618.
Patented Dec. 30, 1919.
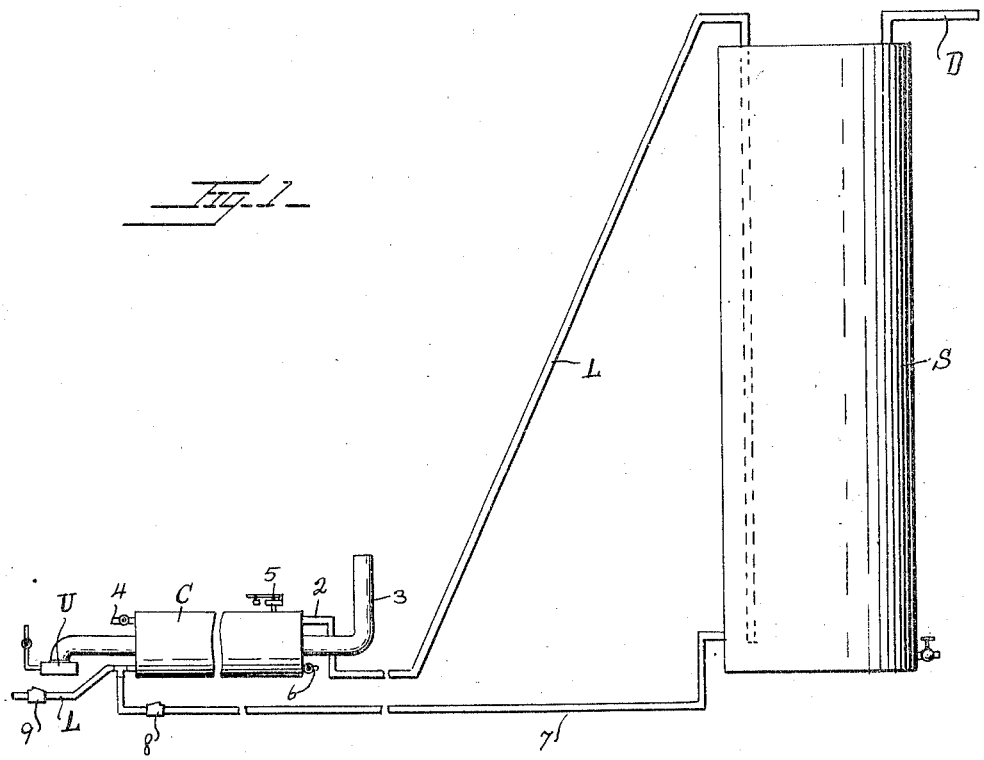
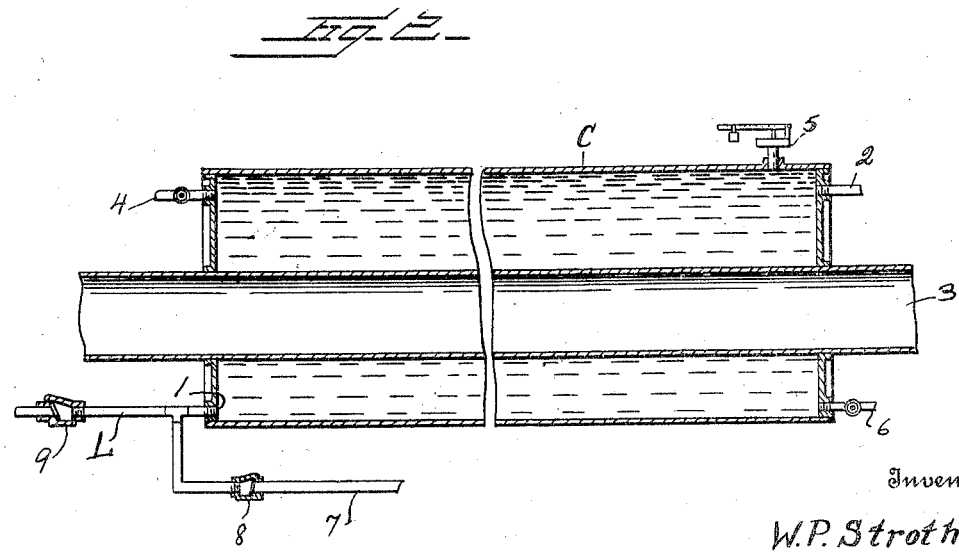
Inventor
W. P. Strother
By Watson E. Coleman
Attorney

UNITED STATES PATENT OFFICE.

WILLIAM P. STROTHER, OF WIRT, OKLAHOMA.

HEATING MEANS FOR MINERAL OILS.

1,326,618.

Specification of Letters Patent. Patented Dec. 30, 1919.

Application filed February 12, 1919. Serial No. 276,563.

*To all whom it may concern:*

Be it known that I, WILLIAM P. STROTHER, a citizen of the United States, residing at Wirt, in the county of Carter and State of Oklahoma, have invented certain new and useful Improvements in Heating Means for Mineral Oils, of which the following is a specification, reference being had to the accompanying drawings.

This invention relates to certain improvements in heating means for mineral oils, and it is an object of the invention to provide novel and improved means whereby the oil at a point in its flow between the well and a settling tank is heated so that the percentage of bottom settlings (B. S.) within the oil when tested is materially reduced.

It is also an object of the invention to provide a novel and improved heating means of this general character consisting of an enlarged chamber or container interposed in the pipe line at a point substantially midway between the well and the settling tank, together with a heating flue disposed through the chamber or container and wherein the intake for the chamber or container is at the bottom thereof and the discharge therefrom at the top of the chamber or container.

Another object of the invention is to provide a novel and improved heating means of this general character embodying an enlarged chamber or container interposed in the pipe line with an upward flow through the chamber or container and wherein the capacity of the chamber or container is in excess of the quantity of oil flowing through the chamber or container within a certain period of time, together with a heating medium associated with said chamber or container.

An additional object of the invention is to provide a novel and improved heating means of this character embodying an enlarged chamber or container interposed in the pipe line, and wherein said chamber or container is in communication with the settling tank so that upon decrease of the supply from the well to the chamber or container oil will be supplied to the chamber or container from the settling tank so that said container or chamber is prevented from becoming dry under the influence of the heating means coacting with said chamber or container.

The invention consists in the details of construction and in the combination and arrangement of the several parts of my improved heating means for mineral oils whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a diagrammatic view in side elevation, illustrating the heating means constructed in accordance with an embodiment of my invention; and Fig. 2 is an enlarged longitudinal sectional view taken through the heater proper as herein disclosed.

As disclosed in the accompanying drawings, S denotes a settling tank which has in communication therewith through the top a pipe line L leading from a well. The pipe line extends within the tank S and terminates in close proximity to the bottom thereof. Also in communication with the tank S at the top is a discharge line D leading to a suitable storage tank or the like.

Interposed in the line L and in practice substantially midway between the tank S and the well is an enlarged chamber or container C with the intake 1 of the container being adjacent the bottom of the container at one end and the discharge 2 being at the top of the container and at the opposite end thereof.

Disposed longitudinally through the chamber or container C and at a point slightly below its center is a flue 3 leading from a suitable heating unit U.

In communication with the chamber or container C at the upper portion of the receiving end thereof is a valve controlled pipe 4, and which affords means whereby oil may be drawn from within the chamber or container C for the purpose of fuel in the event the gas line coacting with the unit U should be out of commission. In communication with the chamber or container C through the top thereof and adjacent the discharge end of the chamber or container is a blow-off 5 which functions in the event the oil within the chamber or container C should be heated to an excessive temperature.

The discharge end of the chamber or container C adjacent the bottom thereof is provided with a valve controlled drain pipe 6 so that the settlings within the chamber or container C may be drawn off when required.

In practice, after the chamber or container C has been completely filled, the heating unit U is placed in operation and the heat passing through the flue 3 brings the oil within the chamber or container C to a temperature to facilitate the continued flow of the oil through the line L to the tank S. It is preferred that the capacity of the chamber or container C be substantially fifty per cent. in excess of the quantity of oil flowing from the chamber or container C in one hour. For example, if the well is making 100 bbls. per day, the amount of oil passing through the heater per hour is substantially 5 bbls., and consequently the chamber or container C will have a capacity of substantially 7½ bbls. In view of this the oil passing through the chamber or container C will be subjected to the action of the heat substantially 1½ hours.

The chamber or container C is maintained full of oil at all times so that there is no space above the oil within the chamber or container for the accumulation of gas, thus eliminating all danger of explosion. The heating of the oil within the chamber or container facilitates the flow of the oil through the line L into the tank S. It will also be obvious that with my improved heater positioned as hereinbefore explained there is no danger of fire, as the oil is confined in the line L and the heat from the flue 3 is hundreds of yards away from any tank.

As the oil is delivered from the line L adjacent the bottom of the tank S the separation of the B. S. from the oil begins. The heated oil and gasolene makes its way to the top of the tank S and passes out through the discharge line D to a storage tank or the like wherein it is tested. With my improved heating means it has often been found in practice that the test shows less than one per cent. B. S. whereby the value of the product is materially increased.

In communication with the pipe line L is a pipe line 7 leading to the tank S and in communication therewith adjacent the bottom thereof, and interposed in the line 7 is a check 8 which is normally maintained closed by the pressure of the oil passing through the pipe line L and which pressure is created through the medium of the pump, not shown, generally employed.

With the pump in proper operation the check 8 is maintained closed and the oil properly flows through the container or chamber C but in the event the pressure of the oil within the pipe line L should materially reduce, as in the event the pump should break down or otherwise stop, the pressure of oil within the tank S will force the check valve 8 into open position, which permits the oil within the tank S to return to the chamber or container C to maintain the same filled, so that said chamber or container will not burn dry under the influence of the heating unit U.

The point of communication of the line 7 with the pipe line L is at a point between the chamber or container C and the check valve 9 and which check valve operates to prevent a retrograde flow through the pipe line L.

From the foregoing description, it is thought to be obvious that a heating means for mineral oils constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. In combination with a pipe line discharging within a settling tank, an enlarged chamber interposed within the line, heating means associated with the chamber, said chamber being entirely filled with the oil flowing therethrough, a line leading from the lower portion of the settling tank to the pipe line at a point in advance of the chamber and a check valve interposed within said last named line and maintained closed by the pressure of the oil passing through the pipe line, said check valve opening under the influence of the pressure of the oil within the chamber upon substantial reduction of the pressure of the oil in the pipe line.

2. In combination with a pipe line discharging within a settling tank, an enlarged chamber interposed within the line, heating means associated with the chamber, said chamber being entirely filled with the oil flowing therethrough, a line leading from the lower portion of the settling tank to the pipe line at a point in advance of the chamber, and a check valve interposed within said last named line and maintained closed by the pressure of the oil passing through the pipe line, said check valve opening under the pressure of the oil within the chamber upon substantial reduction of the pressure of the oil in the pipe line, the intake to the chamber being adjacent the bottom thereof and the discharge therefrom being adjacent the top of the chamber.

In testimony whereof I hereunto affix my signature in the presence of two witnesses.

WILLIAM P. STROTHER.

Witnesses:
 ED DRESSER,
 F. PENNINGTON.